US011303453B2

(12) United States Patent
Brun

(10) Patent No.: US 11,303,453 B2
(45) Date of Patent: Apr. 12, 2022

(54) METHOD FOR SECURING COMMUNICATION WITHOUT MANAGEMENT OF STATES

(71) Applicant: AIRBUS CYBERSECURITY SAS, Elancourt (FR)

(72) Inventor: Paul-Emmanuel Brun, Noisy le Roi (FR)

(73) Assignee: AIRBUS CYBERSECURITY SAS, Elancourt (FR)

( * ) Notice: Subject to any disclaimer, the term of this patent is extended or adjusted under 35 U.S.C. 154(b) by 273 days.

(21) Appl. No.: 16/614,535

(22) PCT Filed: May 17, 2018

(86) PCT No.: PCT/EP2018/062974
§ 371 (c)(1),
(2) Date: Apr. 27, 2020

(87) PCT Pub. No.: WO2018/211026
PCT Pub. Date: Nov. 22, 2018

(65) Prior Publication Data
US 2021/0144130 A1    May 13, 2021

(30) Foreign Application Priority Data

May 18, 2017  (FR) ...................... 1754413

(51) Int. Cl.
*H04L 9/32* (2006.01)
*H04L 9/08* (2006.01)
(Continued)

(52) U.S. Cl.
CPC ............ *H04L 9/3234* (2013.01); *G16Y 10/75* (2020.01); *G16Y 30/10* (2020.01); *H04L 9/085* (2013.01);
(Continued)

(58) Field of Classification Search
None
See application file for complete search history.

(56) References Cited

U.S. PATENT DOCUMENTS 10,826,876 B1 *  11/2020  Sinn ...................... H04L 63/123
2005/0102504 A1 *  5/2005  Le .......................... H04L 63/0428
                                                           713/160
(Continued)

OTHER PUBLICATIONS

Kent, S. et al., "IP Encapsulating Security Payload (ESP)", Request for Comments: 2406, Nov. 1998, pp. 1-22. (Year: 1998).*
(Continued)

*Primary Examiner* — Michael Pyzocha
(74) *Attorney, Agent, or Firm* — Pillsbury Winthrop Shaw Pittman LLP

(57) ABSTRACT

A method for communication between at least two communicating entities, a first communicating entity generating at least one data message comprising a payload and an authentication heading, the method including generating a context parameter including at least one datum representing the material con-figuration of the first entity; generating a security profile in the authentication heading, which defines the conditions of encoding the payload of the message and of generating a signature by an algorithm applied at least to the payload of the message; including the signature in the generated message; inserting a stored identifier of the first communication entity into the authentication heading; and inserting the safety profile into the payload or into the authentication heading.

15 Claims, 4 Drawing Sheets

(51) Int. Cl.
   *H04L 9/40*        (2022.01)
   *H04W 12/03*       (2021.01)
   *H04W 12/30*       (2021.01)
   *H04W 12/041*      (2021.01)
   *H04W 12/069*      (2021.01)
   *H04W 12/106*      (2021.01)
   *G16Y 30/10*       (2020.01)
   *G16Y 10/75*       (2020.01)
   *H04L 29/06*       (2006.01)
   *H04W 12/71*       (2021.01)

(52) U.S. Cl.
   CPC .......... *H04L 9/0822* (2013.01); *H04L 9/3247* (2013.01); *H04L 63/045* (2013.01); *H04L 63/0435* (2013.01); *H04L 63/0442* (2013.01); *H04L 63/0876* (2013.01); *H04L 63/123* (2013.01); *H04W 12/03* (2021.01); *H04W 12/041* (2021.01); *H04W 12/069* (2021.01); *H04W 12/106* (2021.01); *H04W 12/35* (2021.01); *H04L 2209/72* (2013.01); *H04W 12/71* (2021.01)

(56) References Cited

U.S. PATENT DOCUMENTS

| | | | | |
|---|---|---|---|---|
| 2010/0082993 A1* | 4/2010 | Benameur | ............ | H04L 9/3247 713/176 |
| 2013/0019105 A1* | 1/2013 | Hussain | ............ | G06F 21/10 713/189 |
| 2015/0058913 A1* | 2/2015 | Kandasamy | ............ | H04L 63/20 726/1 |
| 2015/0237027 A1* | 8/2015 | Kim | ............ | H04L 63/205 726/3 |
| 2015/0249647 A1* | 9/2015 | Mityagin | ............ | G06F 16/176 713/168 |
| 2016/0049006 A1* | 2/2016 | Mullins | ............ | G06T 19/006 345/419 |
| 2018/0302378 A1* | 10/2018 | Olofsson | ............ | H04L 63/0272 |
| 2021/0012008 A1* | 1/2021 | Kim | ............ | G06F 21/602 |

OTHER PUBLICATIONS

International Search Report as issued in International Patent Application No. PCT/EP2018/062974, dated Aug. 10, 2018.

Jain, L., "CS23259 Project Report—Security Analysis of Remote Attestation," Mar. 2008, XP055694023, Retrieved from the Internet: URL: http://seclab.stanford.edu/pcl/cs259/projects/cs259_final_lavina_jayesh/CS259_rerepo_lavina_jayesh.pdf, 8 pages.

Kothmayr, T., et al., "DTLS based Security and Two-Way Authentication for the Internet of Things," 2012 IEEE 37th Conference on Local Computer Networks Workshops, Oct. 2012, XP032321793, 27 pages.

* cited by examiner

METHOD FOR SECURING COMMUNICATION WITHOUT MANAGEMENT OF STATES

CROSS REFERENCE TO RELATED APPLICATIONS

This application is the U.S. National Stage of PCT/EP2018/062974, filed May 17, 2018, which in turn claims priority to French Patent Application No. 1754413 filed May 18, 2017, the entire contents of all applications are incorporated herein by reference in their entireties.

FIELD

The field of the invention relates to securing communications between two communicating entities, such as one or more entities managing sensors or driving actuators and a central entity remotely managing hardware resources and communicating via network interfaces.

The invention relates in particular to secured communications not requiring a management of states. The field of the invention also relates to securement in generating control data and in driving actuators as well as securing data as such in particular by establishing ad hoc secured communications providing a flexible architecture and adaptable to the Internet of things by taking the limited computational resources into account.

STATE OF THE ART

The Internet of things and strongly digitalised environments come with the setting up of information flows for management, backup or interactivity purposes, for example. Thus, communication securing processes such as virtual private networks also referred to a VPN are known. The setting up of security program such as antiviruses making it possible to protect oneself against different types of attacks are also known. However, these defence means are generally implemented on terminals having huge resources such as smartphones, tablet computers or computers.

There are currently also solutions enabling communications between pieces of equipments to be secured, for example by means of public asymmetric keys and asymmetric private keys or with authentication third parties, but these solutions involve significant computational resources to be ensured by the connected object in terms of cryptographic functions.

When the connected object is passive, that is it does not manage a command coming from a connected control equipment, which could be the server, then it transmits payload data collected by the sensor to the server.

When the connected object is active, it can be controlled by a connected control equipment, which could be the server, the control equipment is thus likely to transmit instructions to a connected object.

In the field of connected objects, there is thus a need for securing communications between the connected objects transmitting data and a remote management central entity.

Indeed, in an environment of the Internet of things type also referred to as IoT, the connected objects have limited resources to encrypt data but are also subject to cyber-attacks or physical attacks. Some connected objects have for example an onboard electronic system having a small processing capacity and are however intended to provide information in real time. There are also securement processes developed for IoT, such as Zigbee, ensuring a communication between the sensing devices and the network access gateway. The end-to-end security is therefore not ensured. This security type can be all the more limited that the sensor network is extended, because of the use of several successive networks. Indeed, hundreds or even thousands of sensors can be used to supervise installations. The radio communications are generally preferred for cost reasons. Finally, an enhanced security can be necessary for some equipment or installations as for example in the military field. Sensors and actuators thus provide an interface with the real world in a wide range of systems.

The present invention aims at overcoming drawbacks of prior art by providing a method securing transmissions between, on the one hand, a control equipment or a server and, on the other hand, one or more connected objects, the method securing in addition the operation itself of remote entities.

SUMMARY OF THE INVENTION

The invention aims at overcoming the aforementioned drawbacks.

According to one aspect, the invention relates to a communication method between at least two communicating entities, a first communicating entity generating at least one payload data message, emitted to a second communicating entity, comprising a payload field including payload data and an authentication header, said method being characterised in that it includes, for generating said message:
- generating a context parameter including at least one datum representative of the hardware configuration of the first entity;
- generating a security profile integrated into the authentication header and defining the conditions:
  - of encrypting the payload data of the message;
  - of generating a signature by a signature algorithm applied at least to the payload data;
- generating said signature integrated into the authentication header;
- inserting a stored identifier of the first communicating entity into the authentication header;
- inserting the context parameter into the payload field or into the authentication header;
- aggregating the payload field and the header.

According to one feature, the message emitted to the second communicating entity is transmitted in an applicative layer of a data network to which the first and the second communicating entities are connected.

According to one feature, the context parameter further comprises one or more of data from the following ones:
- an identifier of a calculator of the first entity;
- a datum representative of the used and not used input/output ports of the first entity;
- an update date of a firmware of the first entity;
- a datum representative of the memory space occupied by the firmware.

According to one feature, the context parameter is encrypted by a first asymmetric public key before being integrated into the emitted message, said first asymmetric public key being recorded in a memory of the first entity, the context parameter being decrypted thanks to the first asymmetric private key recorded in a memory of the second entity.

According to one feature, the second entity comprises a database storing a plurality of context parameters, each being associated with one among several first entities, the receiving by the second entity of said message emitted by the first entity including:

verifying that the context parameter and the identifier of the first entity received by the second entity are present in the database;

processing said message received when the verification state is validated.

According to one feature, the receiving by the second entity of said message emitted by the first entity further includes:

analysing by an application manager the second entity in order to determine whether an update of a firmware or an installation of a new first communicating entity has occurred;

updating the database of the second entity taking into account the context parameter and the identifier of the first entity received when the analysis indicates that an update or a new installation has occurred.

According to one feature, the context parameter is included in the authentication header, the signature being also applied to the context parameter.

According to one feature, the payload data comprise data collected by at least one sensor of the first communicating entity.

According to one feature, the communication method comprises a step of transmitting a piece of information comprising a symmetric shared secret key prior to generating said message of transmitting the payload data, said symmetric shared secret key being used to generate the signature and to encrypt the payload data.

According to one feature, the communication method comprises prior to the step of transmitting the symmetric shared secret key;

generating a second asymmetric public key and a second asymmetric private key by an asymmetric key generation module of the first entity, said generated keys being recorded in a memory;

transmitting by the first entity to the second entity a record request including the identifier of the first entity, the context parameter and said second asymmetric public key;

transmitting by the second entity to the first entity an acknowledgment indicating the recording of the first entity in the database of the second entity;

encrypting from the second asymmetric private key the symmetric secret key.

According to one feature, the communication method comprises a periodic renewal of the symmetric shared secret key including:

generating a new symmetric secret key from a symmetric key generation module;

encrypting, by the second asymmetric private key, the symmetric secret key stored in a memory of the first entity;

transmitting the new symmetric shared secret key to the second entity.

According to one feature, the communication method comprises a periodic renewal of the private secret key including:

generating a new symmetric secret key from a symmetric key generation module;

transmitting the new symmetric shared secret key.

According to one feature, the payload data comprise the context parameter, the context parameter being regularly generated and emitted.

According to one feature, generating said message comprises:

generating a message identifier calculated from:
a randomly generated parameter and provided by a random module and;
an expiry date generated by a clock module;

inserting the message identifier into the authentication header of said message.

According to one feature, the security profile defines the conditions for generating a signature by the signature algorithm which is applied to the payload data of the message, to the context parameter and to the message identifier.

According to one feature, the data signed by the signature algorithm comprise:
the security profile;
the identifier of the first entity.

According to one aspect, the invention relates to a communicating entity comprising at least one memory, a calculator and a communication interface for carrying at the communication method according to the invention.

According to one embodiment, the communicating entity comprises at least one data sensor.

According to one aspect, the invention relates to a computer program including a set of instructions for implementing the communication method of the invention.

Further advantageously, the secured communication method provides a solution which:

enables inexpensive devices to be chosen in particular because of their reduced capabilities in terms of computational load for the connected object;

enables transmissions of payload data that could be critical to a data managing server to be secured;

possibly enables transmissions of control data transmitted from a control equipment to a connected object to be secured;

enables the integrity of one or more components and one or more hardware configurations of the connected object to be verified;

enables an end-to-end securement of communications on a wide variety of networks.

BRIEF DESCRIPTION OF THE FIGURES

Further characteristics and advantages of the invention will appear upon reading the detailed description that follows, in reference to the appended figures, given by way of example, which illustrate.

DESCRIPTION

Definitions

Figure 1:
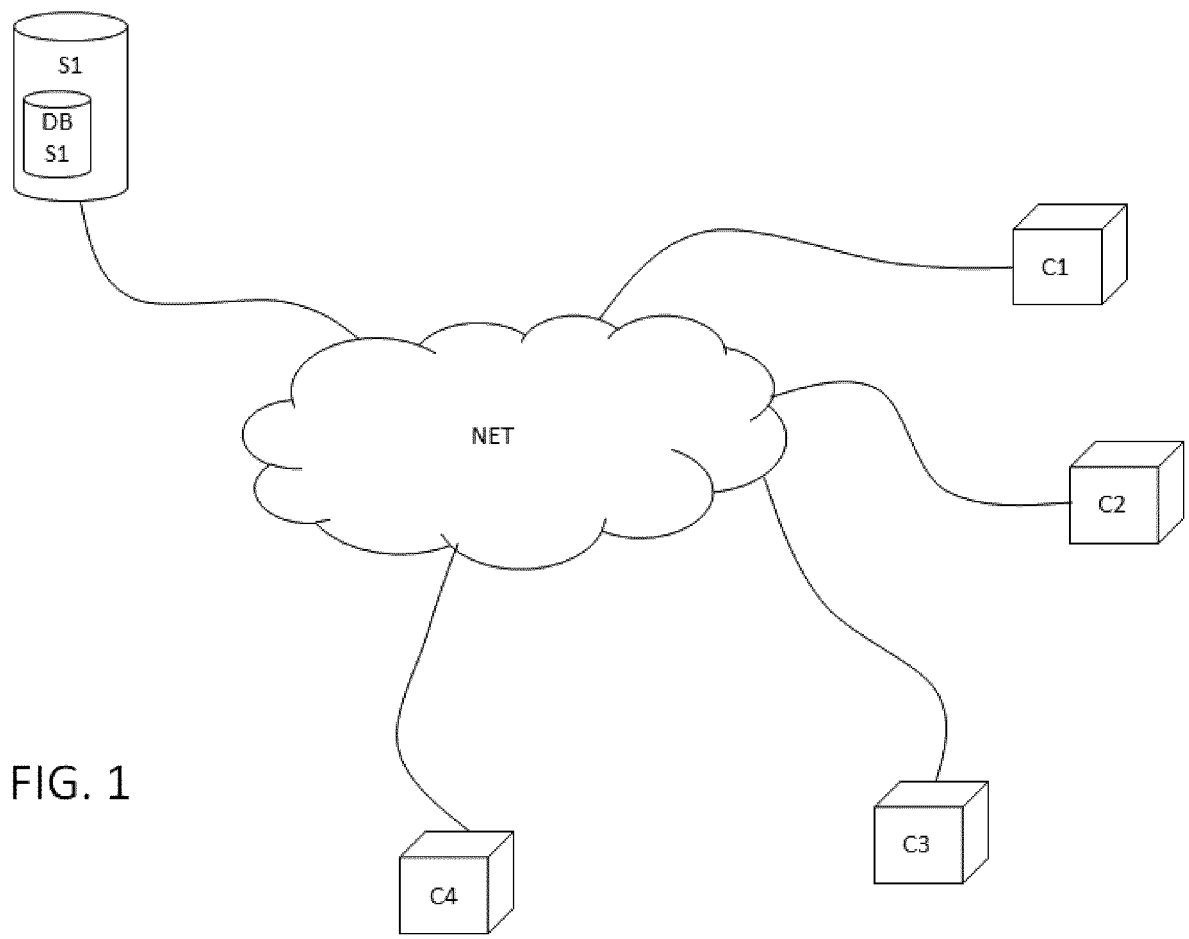
FIG. 1: a general scheme of a network architecture including a server and a plurality of clients implementing a method according to the invention.

The invention relates to communication securement and authentication between two communicating entities.

The description specially relates to two entities being respectively a client and a server. The client C1 is for example a connected object and the server S1 is of the data server type receiving, to utilize of them, the payload data Data1 collected by a sensor of the connected object.

In the present description, a first communicating entity C1 designates the communicating entity C1 which transmits payload data for example collected by one or more sensors. The sensors measure for example physical quantities like temperatures, pressures, vibrations, forces and accelerations. The first entity can comprise one or more actuators. The first entity can also comprise a set of sensors and actuators, the sensors providing for example information about the state or position of the actuators.

The second communicating entity S1 designates the communicating entity S1 which receives the payload data. The second communicating entity will be for example a central unit. The second communicating entity can be connected to several first entities comprising sensors or actuators.

The second communicating entity S1 can in particular transmit commands to the first communicating entity Ci in order to control a function, configure a component or a software, update a software, or even define new default configuration parameters.

In the present description, the client corresponds for example to the first communicating entity, the server corresponding to the second communicating entity.

In the continuation of the description, a message mes1 aiming at transmitting payload data Data1 includes two parts: an authentication header Token1 and a payload field including payload data Data1. The payload data message can comprise, in addition to the payload data Data1, data relating to the protocol or identifiers or even signatures.

For the sake of simplicity, the payload field will be more generally understood as the payload data Data1 which can also be referred to as Data1.

Remote Entity

The remote entity which corresponds to the first entity is for example the client entity. The remote entity comprises for example a calculator, a memory and a communication interface comprising in particular several input and output ports. The remote entity can consist of a computer, a tablet computer, a smartphone, or even an industrial equipment of the smart box type comprising sensors or actuators or any electronic equipment dedicated to an application aiming at transferring data in a secured way.

The first entity is for example a connected object including a sensor and generating data representative of the measurements performed by the sensor, transmitted to a server being the second communicating entity.

The first communicating entity C1 comprises for example an operating system or a firmware. The first entity thus performs a set of functions for managing its sensors and actuators but also for performing securement of data to be transferred.

The first entity is thus associated with an equipment the configuration of which enables it in particular to be identified within a communication network or at least from the second communicating entity. The first entity C1 thus comprises an identifier noted C1_Id. Such a client equipment is indifferently noted C1, C2, Ci, i∈[1; N].

Central Entity

The central entity which corresponds to the second entity is for example the server entity. A server S1 comprises for example at least one memory and one calculator as well as a communication interface. The second entity S1 is for example a computer or a work station connected to a network, such as the Internet network, or a smartphone or a tablet computer connected to a mobile network. The second entity is for example configured to receive messages from different first entities and store the data received from these first entities. The second entity is for example configured to send commands to different first entities.

The first entity S1 can decode or decrypt the received data by means of a decoding module Decoding_Module1.

The first entity S1 stores for example in a database BDS1 data relating to a plurality of first entities such as connected objects.

The first entity S1 can also store cryptographic data it generates or receives from each first entity. The first entity S1 includes for example in a memory cryptographic keys received from a first communicating entity such as C1, namely at least one symmetric private key KSec and an asymmetric public key KPub2.

The first entity S1 includes for example in memory an asymmetric private key Kpriv1 and an asymmetric public key Kpub1. These keys can be generated for example by an asymmetric private key generation module ASymKGen1.

The second entity being in the form of a data managing server provides for example services for managing a set of sensors and actuators via first entities. The second entity can also provide services to the first entities such as recording each first entity at the first entity.

The second entity is generally designated as being the server entity and the first entity(ies) as client entities but the client and server functions can be reversed depending on the steps of the method according to the invention.

It is noted that the second entity server S1 does not correspond in particular to an authentication server exclusively performing authentication functions as an authentication third party coupled with another data server.

Advantageously, the present invention enables in particular secured communications between at least one client and one data server to be established, providing a securement of exchanged data.

As represented in FIG. 1, the second communicating entity S1 comprises a database DBS1 enabling in particular data relating to a plurality of first communicating entities to be recorded.

The different first entities C1 to C4 communicate, to the second entity S1, payload data Data1 collected by one or more sensors of each of the first entities or generated by functions internal to each first entity. A module of a first entity performs for example an identifier (IdCo1) reading function of a calculator (Co1) of the first entity (C1). A module of a first entity performs for example an input and output port testing function to generate a datum representative of the used and not used input/output ports of the first entity (C) and in particular the number of used ports. A module of a first entity performs for example a firmware update date reading function of the first entity. A module of a first entity performs for example a calculating function of the memory space occupied by the firmware.

The method of the invention advantageously enables the securement of payload data Data1 to be transmitted between two communicating entities for example by one or more encryptions or controls. The hardware configuration of the entity emitting the payload data message can in particular be verified.

Advantageously, the messages are transmitted in an applicative layer of the successive data network(s), which enables the end-to-end securement of the data transmission. A data network used is for example the Internet network, a wired local network, a mobile network or a radio local network such as WiFi.

Symmetric Key Management

The method of the invention for example implements an exchange of a symmetric secret key shared between the two communicating entities C1 and S1.

The symmetric secret key is generated, in the first entity C1, by a cryptographic component SymKGen. This component SymKGen enables at least one shared symmetric secret key KSec to be generated.

The symmetric key KSec is for example transmitted in a piece of information exchanged beforehand between the first entity C1 and the second entity S1 such that these two entities both have a shared secret.

Figure 3A:
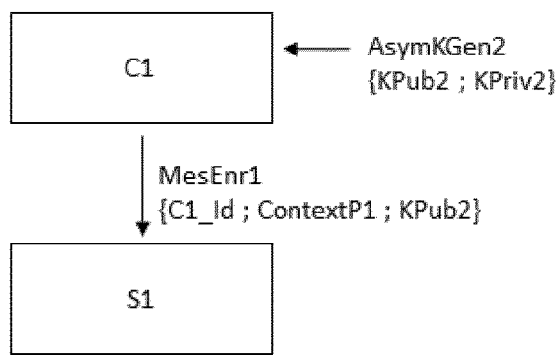
FIGS. 3A to 3B: functions implemented in a method according to the invention.
Figure 3B:
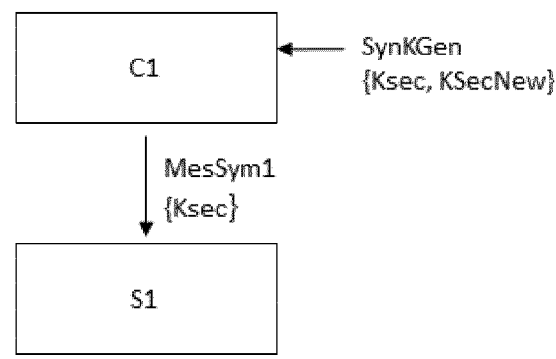

FIG. 3B represents an information transmission comprising the symmetric secret key. The symmetric shared secret key KSec can be used to generate a signature Sign1 and to encrypt the payload data Data1. The resources necessary to the shared secret key encryption are advantageously fewer than for an asymmetric private key. The second entity S1 receiving the payload data message is thus able to verify the authenticity of the signature Sign1 and to decrypt the payload data encrypted with this shared symmetric secret key.

The symmetric secret keys KSec can be periodically renewed by the first entity C1 and periodically transmitted to the second entity S1.

A same shared symmetric secret key is thus stored in a memory of the first entity C1 and the second entity S respectively.

Asymmetric Key Management

The method of the invention can include generating a couple of asymmetric cryptographic keys by the first entity C1 or by the second central entity S1. The use of asymmetric public and private keys is preferably restricted with respect to the use of the shared symmetric secret keys as above described, so as to optimise hardware resources necessary for data processing.

The asymmetric key generation function can be made by a software or hardware cryptographic component of the equipment. The asymmetric private key KPriv2 or KPriv1 is for example stored in a memory or in a dedicated security component as for example TPM for "Trusted Platform Module".

The first entity can read and store the public key KPub1 generated by the second entity to encrypt data. The second entity S1 comprises in particular an asymmetric key generator ASymKGen1 and stores a generated asymmetric private key KPriv1.

The first entity C1 can also generate a couple of private asymmetric key KPriv2 and public asymmetric key KPub2 for the second communicating entity, using an asymmetric key generator ASymKGen2. The public asymmetric key KPub2 will then be transmitted to the second entity and stored in memory. The second entity can then encrypt data for the first entity and decrypted from its stored asymmetric private key KPriv2.

Context Parameter

According to the method of the invention, a context parameter ContextP1 is transmitted by the first entity C1 to the second entity S1.

Figure 2:
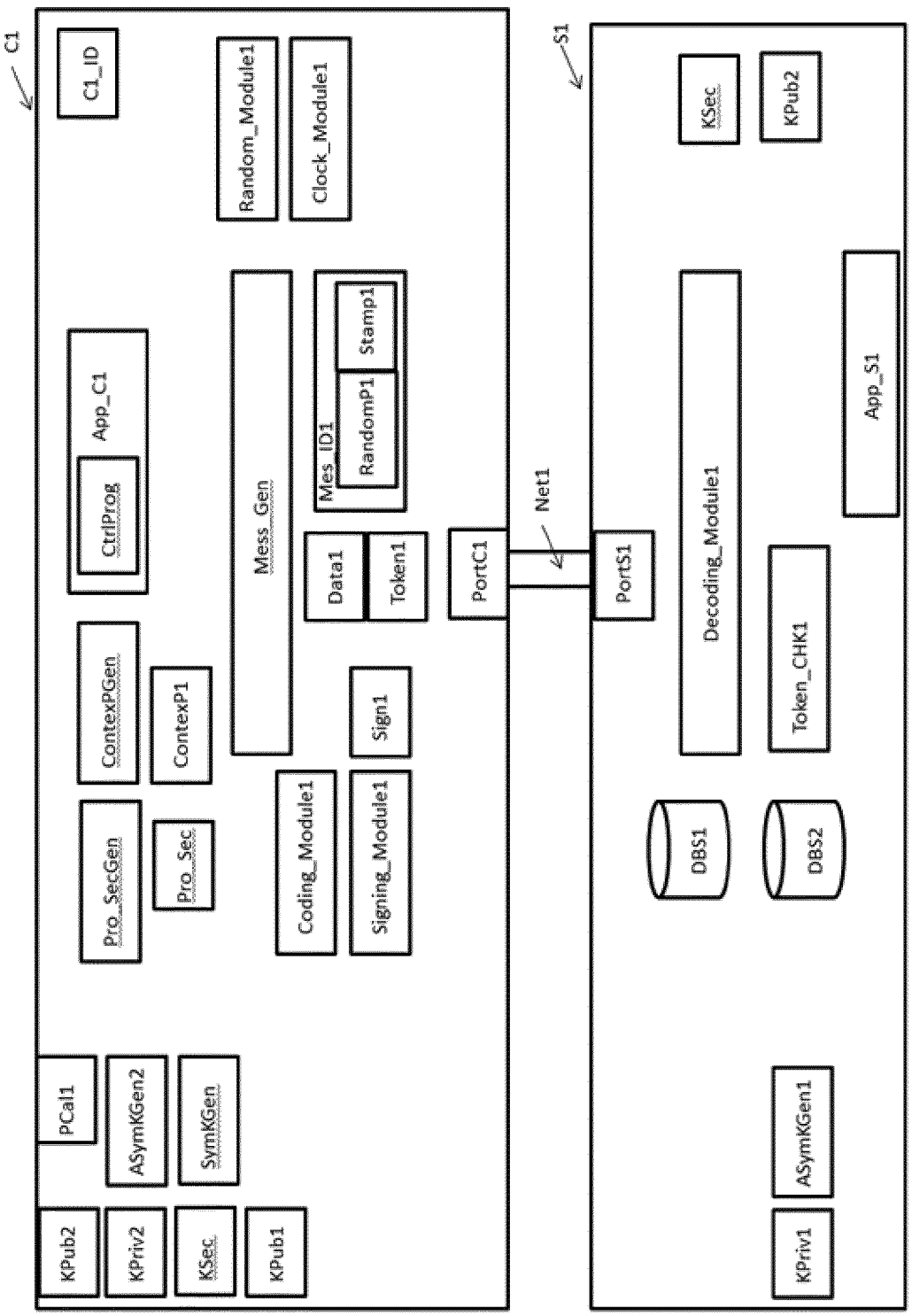
FIG. 2: an example of architecture of a server and of a client implementing a method of the invention.

The context parameter ContextP1 is generated by a context parameter generation module referenced ContexPGen in FIG. 2.

The context parameter ContextP1 comprises at least one datum representative of the hardware configuration of the first entity C1.

The context parameter ContextP1 comprises, for example, one or more of the data from the following ones:

an identifier IdCo1 of a calculator Co1 of the first entity C1 or of another hardware component such as a ROM, RAM or FLASH memory or another memory card;

a datum representative of the used and not used input/output ports of the first entity C1;

an update date DM_Co1 of a firmware CtrlProg of the first entity C1 or an updating datum of another stored sub-program;

a datum representative of the memory space occupied by the firmware or by another stored sub-program.

When a program is installed in a stable memory of the first entity, that is for example, a memory space modified only in case of the Firmware update, it is possible to detect a pirate sub-program added in memory for malicious purposes, because of the additional space occupied.

One advantage of using a context parameter ContextP1 relating to a hardware identifier of a component is to detect a possible hardware tampering by the second entity by comparing a hardware identifier initially stored with a hardware identifier included in a payload data message.

One advantage of using a context parameter ContextP1 including a datum representative of the used or not used input/output ports is to detect a client out of service or unplugged or disconnected function or a fraudulent connection to the first entity.

This context parameter ContextP1 is advantageously sent to the second communicating entity for control purposes by the second communicating entity.

The context parameter is for example crypted before being sent to the second entity. A public key KPub1 provided by the second entity is for example used for that purpose.

Figure 5:
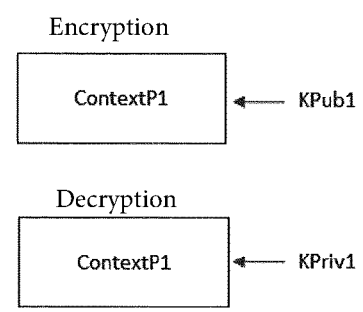
FIG. 5: steps of encrypting and decrypting the context parameter according to an exemplary embodiment.

FIG. 5 represents the encryption of the context parameter ContextP1 from the asymmetric public key KPub1 of the second entity to be decrypted upon receipt by the second entity S1 by using its asymmetric private key KPriv1.

Method for Generating an Enrolment Request

The method of the invention can comprise enrolment steps. The enrolment is made prior to the transmissions of the payload data Data1 between two communicating entities C1 and S1. The enrolment enables a first entity and data relating to this first entity prior to the transmission of payload data to be recorded. These data relating to the first entity correspond for example to the shared secret key.

The shared secret key can be regularly renewed, as a security measure.

As represented in FIG. 3A, the first entity C1 performs an enrolment from the second entity S1, by generating a request noted MesEnr1. This request comprises for example the identifier C1_Id and the context parameter ContextP1 encrypted using the public key KPub2.

This solution is efficient in particular in terms of calculations because it enables a short message, which comprises the symmetric key, to be encrypted, with an asymmetric key.

The identifiers of each first entity such as C1 in association with their context parameter are for example recorded in a database of the second entity S1.

The second entity S1 is then capable of associating a first entity C1 with its context parameter ContextP1.

In a non-limiting way, the enrolment can be initiated by the first or the second entity. Public key exchanges are for example automatically performed upon receiving a first message MesEnr from either of the entities C1, S1.

Key sharings can also be performed by a supervision program accessing the second entity and the first entities.

According to other exemplary embodiments, acquiring a public key of the server KPub1 can be generated by using a file such as an image, a captcha code, a bar code or a code

20, such as a QR code. Acquiring the public key of the server KPub1 by the client can be made, in the latter case, by reading the code or the image comprising said key by image capturing means such as an optical sensor.

According to one embodiment of the invention, the method for generating an enrolment request MesEnr1 by the client C1 comprises a step of generating a public key of a client C1, noted KPub2, and a private key of a piece of equipment noted KPriv2.

In the latter case, a couple of keys is generated together. When the step of generating the couple of asymmetric keys has been performed beforehand, the method for generating an enrolment request can aim at extracting the public key of the client C1 from a memory of said client C1 to include it in the request.

The enrolment request can also comprise the following data:
the context parameter, ContextP1;
the identifier of the client, C1_Id;
the asymmetric public key of the client, KPub2.

A mechanism of renewing asymmetric keys by the first entity or by the second entity can also be contemplated.

The new public key of the client KPub2 can be for example transmitted to the server S1 thanks to a new enrolment. Enrolment steps are thereby reiterated.

Receiving the Request by the Server

When the second entity S1 receives a payload data message, the second entity S1 initiates for example a step of decrypting the data by means of the shared secret key.

The decrypted data are then extracted and stored in a memory of the second entity S1. The second entity S1 can then perform a control of the context parameter ContextP1 and of the identifier of the client C1_Id compared to the data stored in its database BDS1. If the comparison is valid, the message is authenticated and its processing is continued.

Otherwise if the compared data do not correspond, the second entity can for example stop the processing and send an alert message. The second entity can also trigger a verification relating to updates of the first entities or connections of new entities.

Payload Data Transmission

Figure 3C:
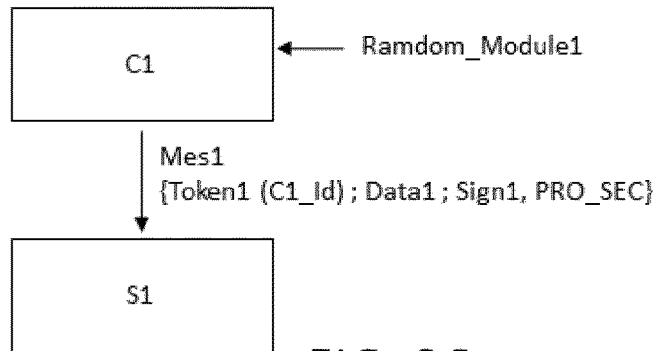

The communication method of the invention enables data to be emitted and received as messages between two communicating entities, these messages are noted Mes1 and comprise the payload data Data1. FIG. 3C represents the step of transmitting a message Mes1 including the payload data Data1 and an authentication header Token1.

The method of the invention enables communications to be securely exchanged by defining messages the security of which is "self-contained", that is each message Mes1 exchanged comprises its own security information enabling the message sent to be processed and decrypted.

The invention does not require in particular establishing a session between both communicating entities ensuring a secured channel between both entities.

The invention thus comprises a mechanism of generating an authentication header of the messages of data transmitted between both entities.

The following description describes an embodiment in which the client C1, representing a first communicating entity, emits a message Mes1 to the server S1, representing the second communicating entity, this message being verified by the server S1. The client and server roles can however be reversed between the first and second communicating entities.

Authentication Header of a Message Mes1

Following the enrolment step when it occurs, the invention implements a communication method enabling secured payload data messages Mes1 to be transmitted in particular by the use of the authentication header, noted Token1.

The communication method can also be carried out without the prior enrolment.

This is for example the case when the data exchanged in the enrolment method would be defined by a supervisor program in each equipment C1, S1, as for example the exchange of public keys and equipment identifiers.

The authentication header Token1 is generated by a component of the client C1. On the server side, a component verifies the authentication header received from the client C1.

The authentication header Token1 of the messages Mes1 transmitted comprises different data fields including the client identifier C1_Id.

Token1 can comprise an identification Mes_Id of the message Mes1, and possibly a security profile PRO_SEC which enables encryption or decryption conditions to be defined. The security profile is generated by a security profile generation module Pro_SecGen.

Token1 can comprise a signature Sign1.

The authentication header Token1 can be, for example, integrated into the headers of the transport protocol used depending on the communications performed, such as a header of the http protocol for example.

According to one embodiment, the authentication header is added to the list of the headers of the transport applicative protocol used by the application.

In the example of the HTTP protocol, according to one embodiment, the content of the authentication header generated by the present invention is associated with the "Authorization:" header of the HTTP/1.1 protocol according to RFC [2616].

The message Mes1 is generated by the module Mess_Gen by aggregating the header Token1 to the payload field Data1. A coding module coding_Module1 enables the message data to be encrypted. The coding module thereby encrypts the data of the message Mes1 as a function of data to be encrypted or not, as indicated in the security profile, and keys stored and necessary to perform these operations.

Message Identifier, Mes_Id

The calculator can recover a message identifier Mes_Id which is generated by a message counter which generates message identifiers. FIG. 2 represents a component Mes_ID1 enabling message identifiers Mes_Id to be generated and processed.

The message counter generates for example the Mes_Id from a random variable, that is a random parameter Ramdom P1 and an expiry date Stamp1. The random variable RamdomP1 enables a single identifier Mes_Id of the message to be defined. The random state RamdomP1 can be for example generated from a random variable generation module noted Ramdom_Module1.

The latter can be executed by the calculator.

When the identifier of the message Mes_ID1 is calculated in particular from an expiry date Stamp1 defined by a local clock module Clock_Module1 of the equipment C1, the identifier Mes_Id comprises a piece of information relating to the expiry date Stamp1 of the message Mes1 which can be verified upon receipt by the server S1.

According to an alternative embodiment, the Mes_Id can be generated with a non-random parameter and an expiry date Stamp1. The identifier of the message Mes_ID1 can be for example calculated on-the-fly, that is in real time by a calculator of the communicating entity C1. The identifier of the message Mes_ID1 thus calculated is assigned to a message Mes1.

Security Profile

According to one embodiment, the security profile PRO_SEC enables an algorithm which will be used to sign or encrypt the content to be transmitted, to be defined. The security profile PRO_SEC can be generated from a module Pro_SecGen, noted in FIG. 2. The module Pro_SecGen enables the security profile PRO_SEC to be preconfigured so as to fulfil the requirements of a given application, a given context or an instruction emitted by the user. The security profile included in the payload data message thereby provides information for the decoding mode.

The security profile PRO_SEC can also be used to indicate and define whether the response to the message Mes1 emitted by the server S1 should also be decrypted and according to which algorithm. This embodiment is in particular advantageous when the server transmits commands to the client C1.

The different communicating entities C1, S, such as a server S1 and a plurality of clients Ci can comprise a configuration of predefined security profiles. Each predefined profile can be activated to define a way of emitting and receiving data with another entity.

Different security profiles can thus be predefined.

A first security profile corresponds for example to the activation of a security parameter P1 incorporated into the authentication header Token1 of the message Mes1 to be transmitted by the client C1 to the server S1. This parameter P1 indicates the presence of an encryption of the transmitted payload data Data1. Thus, the server S1 receiving this parameter P1 is capable of implementing an encryption of the transmitted data when the same are encrypted.

A second profile corresponds for example to the activation of a security parameter P2 incorporated into the authentication header Token1 of the message Mes1 to be transmitted by the client C1. The parameter P2 makes it possible to indicate that the authentication header Token1 is signed. The signature Sign1 is in this case performed by the client C1 thanks to the client private key KPriv1. The signature Sign1 is in particular incorporated into the authentication header Token1.

The advantage this configuration is to enable the establishment of communications the security of which is fully self-contained between two communicating entities C1, S1.

The different security profiles enable for example the security level of data exchanges between the communicating entities C1, S1 to be adapted according to the data exchange context or the type of data to be exchanged.

The security profiles PRO_SEC can also use another security parameter representative of the format of the signature used for the authentication header.

This parameter makes it possible to define the use or not in the signature of:
 one or more data fields of the authentication header Token1 of the message;
 the payload data.

A security parameter of the header can also be representative of the applied signature format defined by at least any of these data or a combination of these data:
 the algorithm of a hash function;
 the encryption algorithm;
 the key type;
 the indication of the data to be signed such as for example the data fields of the authentication header as well as the payload data.

When an entity receives a security profile PRO_SEC it does not know, that is which is not predefined in a memory of the entity, then a default profile can be used.

The enrolment can in particular comprise transmitting the definition of a security profile PRO_SEC. Upon receipt, an entity can then record the definition of the new security profile and use it to deploy a strategy of encrypting the emitted messages or decrypting the received messages.

Further, the security profile PRO_SEC comprises designating a signature generation algorithm such as for example RSA-SHA256 and possibly the designation of a data encryption algorithm, such as for example AES.

The security profile PRO_SEC thus comprises an indication about the presence of a signature Sign1 and about the presence of an encryption of the data and possibly, the security profile PRO_SEC comprises the designation of the algorithms used to generate the signature or encrypt the data.

Signature

According to one embodiment, the authentication header Token1 also comprises a signature of the data transmitted in the header Token1. A signature Sign1 is created by means of a signature generation algorithm Signing_Module1.

The signature Sign1 is for example made by means of a public key KPub2 acquired by the signing communicating entity C1 or by means of the shared secret key KSec.

The signature is applied to a set of elements of the message including the payload data of the message. The context parameter can also be integrated into the payload data.

The context parameter can also be transmitted in the authentication header and taken into account in the signed data.

The payload data, when signed, can correspond to the encrypted payload data or to the not encrypted payload data.

The signature Sign1 can be for example generated from the data: Mes_ID1, C1_Id, PRO_SEC and the message content Data1.

An algorithm based on a method RSA SHA256 can be for example implemented by the invention to generate the signature Sign1. It is reminded that the acronym SHA stands for "Secure Hash Algorithm" and corresponds to a cryptographic hash function. The RSA is an asymmetric cryptography algorithm using a couple of asymmetric keys. Both algorithms can be associated in a single encryption algorithm.

An algorithm ECDSA standing for "Elliptic Curve Digital Signature Algorithm" can also be used according to the method of the invention. This is a public key digital signature algorithm.

The signature generation algorithm can also be automatically determined, among several algorithms, depending on the client equipment or its operating system and for example depending on the context parameter. One advantage is to use the already existing resources on an equipment and to take the equipment hardware configuration into account.

A field of the authentication header Token1 comprises the signature Sign1 generated and another field can be filled in the header Token1 to designate the algorithm enabling the signature Sign1 to be generated. Another field also designates the encryption algorithm for the payload data Data1.

Upon receipt, the data server S1 can decode the signature Sign1 by selecting the proper algorithm as indicated to decode the signature Sign1.

The term "protocol header" is used to differentiate it from the authentication header Token1 of the invention.

By way of example, the different http protocol fields of the following example can be used according to one embodiment of the invention to sign the authentication header. The http request has for example the following form:

header:
POST http://control_center_urllrest/conso HTTP/1.0
Accept: application/jsonUser-Agent: Mozil/a/4.0 (compatible; MSIE 5.0; Windows 95)
Authori:zation:JohnDo:Android22434:
143089653303797:0neWa Signature_RSA-SHA256_none: w9Bgirb8 . . . .
Message body (body):
{"P I"-=2345, "HCHC"-=29384632, "HCHP"=2936241490}

One or more data relating to the transport protocol data can be used. Part of a field of a protocol header can also be used. For example, the field Method of the http protocol specifying the request type including in particular the values {GET, PUT, P0$1}, present in the request line of a http request has an interest in signing the authentication header Token1. This taking into account enables in particular "replay" type attacks by a third party to be avoided by making another action than the initial request.

A message header of a transport applicative protocol is for example defined by a couple {key: value}. For example, for the HTTP protocol, the header [Expires: "Sat, 7 Nov. 2015 00:59:59 GMT" ] represents an expiry date for the request. According to the same protocol, the request type and the address of the resource to be queried are contained in the request line of the message, for example [POST http:/lcontrol_center_ur/rest/conso HTTP/1.1], and can be used to generate the signature Sign1.

This embodiment is particularly advantageous to ensure integrity of data exchanges.

According to the same example, when the data are signed with the couple [Expires: "Sat, 7 Nov. 2015 00:59:59 GMT" ], and with the type of the HTTP request, which is in this case a "POST" type request, it is not possible that a replay attack by reusing the same data with a different request type and/or with a different expiry date is initiated by a third party since in this case, the signature Sign1 will not be recognised by the server S1.

However, an implementation of the communication method secured independently of the communication protocol is preferred.

Generating a signature Sign1 comprises for example executing a hash function of the non encrypted payload data to be signed. The payload data are for example encrypted before being transmitted. Thus, if a non-authorised third party recovers a signed message, it is not possible for this third party to restore the data which have been signed from the signature Sign1.

The signature can also be applied to the crypted payload data.

The signature also makes it possible to verify that the signed transmitted data are not falsified.

Taking into account in the signed data the message identifier Mes_ID1, which changes at each message Mes1, enables thanks to the hash function a content of the signature which is fully different from one message to the other to be generated.

The generation of a signature Sign1 can also be applied to data to which a padding function is applied, that is a data filling function.

Data Encryption

When the data encryption option of a message emitted by the client C1 is activated, the security profile PRO_SEC defines which algorithm is used to encrypt the data.

The security profile PRO_SEC is indicated in the authentication header Token1 of the message Mes1 and enables the encryption algorithm designation to be indicated.

The security profile PRO_SEC can also be part of the signed data. The payload data of the message Mes1 which are transmitted to the server S1, are encrypted with the algorithm determined by the client C1. The data can then be decrypted, on the server side, by means of the indication of the algorithm used.

The data encryption algorithm can be automatically determined, among a list of available algorithms, depending on the client C1 equipment or its operating system or the context parameter. One advantage is to use the already existing resources on an equipment and depending on its configuration.

One example of algorithm according to the invention can be AES standing for "Advanced Encryption Standard". This is an advanced encryption standard also known as <<Rijndael>>.

Other algorithms such as Script or Vscript can alternatively be used according to the method of the invention. The payload data Data1 are encrypted by means of a shared symmetric secret key KSec.

The encryption operations are advantageously optimised by means of the symmetric key encryption.

The use of the asymmetric key encryption comprising a public key and a private key can also be contemplated but involves operations on larger key sizes and thus more complex and resource consuming for data processing.

The security profiles PRO_SEC advantageously indicate the signature or encryption type. It is for example specified whether a message includes a signed header and a one-way encrypted content.

When the client C1 is a connected object remotely drivable from a server S1 and an encryption of data emitted from the server S1 to the client C1 has been decided, then a mechanism involving the transmission of the security profile can also be set up.

Advantages of the Transmission of Fields in the Header

The field Mes_ID1 enables a security against replay attacks of third party messages to be defined.

The field C1_Id enables a security to be defined when an equipment has been suspended or revoked by the server S1.

Figure 4:
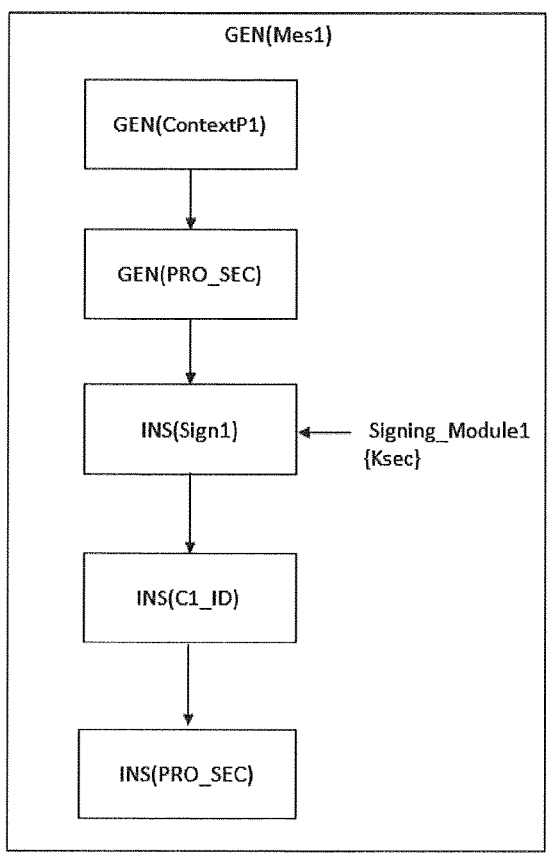
FIG. 4: steps of a method of the invention.

FIG. 4 represents steps of the communication method of the invention from the point of view of a communicating entity which generates a message Mes1.

The method according to the invention enables in particular a message Mes1 to be generated and the succession of steps are noted GEN (Mes1). This method comprises generating an authentication header Token1 and the payload data Data1.

A first step, noted GEN(ContextP1), consists for example in generating the context parameter ContextP1. It comprises at least one datum representative of the equipment hardware configuration. This can be for example a state variable of an input/output port such as the port noted PortC1 of the client C1. The port Port1 forwards the data emitted by C1 on the network Net1 in particular to the server S1 via the port PortS1.

According to other exemplary embodiments, other hardware configurations can be generated in the context parameter ContextP1. For example, this can be an update date of a "Firmware" CtrlProg, that is a hardware operating software of one or more equipment components. App_C1 represents an application dedicated to the interactions with the environment by the management of sensors or actuators. The context parameter can be for example representative of the number of sensors or actuators in use.

According to other embodiments, the context parameter ContextP1 can be complex and comprise several values representative of a set of different hardware configurations of different components of the client C1, such as a sensor, a port, a memory, a microprocessor or an antenna. The number of connected input and output ports can also be taken into account. A datum representative of the used and not used input and output ports can also be integrated into the context parameter.

Identifiers of components can also be integrated into the context parameter ContextP1.

The context parameter ContextP1 is for example automatically generated as a function of variables making it up.

The method comprises for example a next step of generating the security profile PRO_SEC noted GEN(PRO_SEC). The generated security profile PRO_SEC is integrated into the authentication header token1.

The method then includes for example a step of inserting the signature Sign1, noted JNS(Sign1), into the message Mes1.

The method includes for example a next step of inserting the client identifier C1_Id, noted INS(C1_Id) into the message Mes1. The identifier C1_Id is preferentially included in the authentication header.

The method for example comprises a next step INS (PRO_SEC) of inserting the security profile PRO_SEC which defines the conditions for encrypting and generating a signature Sign1.

The message Mes1 including the authentication header Token1 and the payload data Data1 can then be generated GEN(Mes1) by aggregating the header and the payload data.

This payload data message can thus be emitted, according to a communication protocol used, to emit data between the client C1 and the server S1.

Server, Enrolment Management

The data server which corresponds to one of the communicating entities of the invention is intended for managing data transmissions with a plurality of clients Ci. To that end, it comprises a component enabling the equipments to be managed, such as a memory in which the database BDS1 records the data of each client Ci such as the identifier Ci_Id and the context parameters ContextP1.

Further, the server S1 can comprise a memory to store data relating to encryptions in association with each client equipment in a memory noted DBS2 which stores asymmetric public keys KPub2 of the equipment C1, as well as the shared secret symmetric keys KSec.

The server executes for example a first storage function for the client counts and a second receiving and processing function of enrolment requests emitted by the client equipment Ci.

Processing a request comprises for example data decryption operations and operations of verifying that the client equipment Ci is not suspended or revoked or that the message received is valid aiming at verifying, that a hardware anomaly occurred in the client equipment Ci. The context parameter can be for example analysed for a compliance analysis of the equipment hardware configuration.

Server—Message Reception, Decryption

The message Mes1 emitted by the client equipment C1 is received by the Server S1 via a communication interface. A component of the server S1 carries out for example a step of verifying the received message Mes1 and in particular its expiry date.

The server S1 comprises in particular a set of asymmetric keys comprising a public key KPub1 and a private key KPriv1 for decryption purposes, as a function of the parameters of the security profile.

The message Mes1, received by the server S1, has for example been encrypted, by the client C1, with the asymmetric public key of the server KPub1. This asymmetric public key of the server KPub1 has been acquired beforehand by the equipment, for example, at the time of its installation or of an enrolment. A supervisory program can also be used to parameterise a client or the server.

A verification of the authentication header Token1 can be made by means of a verification module noted Token_ChK1.

Server—Verification of the Message Identifier

The message verification comprises in particular the control of the message identifier Mes_ID1, and in particular its expiry date. When the expiry date is expired, the server S1 can initiate a rejection of the received message Mes1.

In the case of a too significant date deviation, the server S1 can send back a specific error containing the current date of the server. This alternative makes it possible for the client C1 to be resynchronised and reemit again messages with valid authentication headers Token1.

Verifying the MES_ID1 by the server S1 enables replay network attacks of the message Mes1 to be limited.

A second verification performed by the server S1 can consist in particular in verifying whether the message Mes1 has already been received by the latter. If the message has already been received, that is the MES_ID1 of the message received Mes1 is identical to a MES_ID of a previously received message, then the message Mes1 is not processed by the server S1.

The message identifier can also be signed, for example, using a shared symmetric secret key stored by the server. The validity of the message identifier is then also confirmed upon verifying the signature in the authentication header.

When the signature Sign1 is invalid, the message Mes1 is for example rejected by the server S1.

When the signature carried out from a private asymmetric key, the server performs for example the reading of the public asymmetric key in the server memory or directly at the equipment.

Signature Verification

When the transmitted messages are signed with a shared secret symmetric key KSec, the shared secret symmetric key KSec is stored in a memory by the server S1 in order to be used to verify the signature Sign1.

The messages can thus be signed using a public asymmetric key KPub1 provided by the server KPriv1 which then uses its private asymmetric key to verify the signature Sign1.

Preferably, a shared secret symmetric key will be used for equipment not having such a computing power.

The security profile PRO_SEC comprises in particular the format of the signature Sign1 including the signed data and the designation of the algorithm used.

Message Decryption after Verifications

When the message identifier MES_ID1 and the message authentication Mes1 have been verified by the server S1, the latter performs for example the decryption of the data as indicated in the security profile PRO_SEC.

The security profile PRO_SEC indicates for example that the payload data are encrypted with the shared secret symmetric key and enables the server S1 to initiate the decryption of payload data Data1 of the message Mes1 by means of the shared symmetric key KSec stored in the memory by the server.

The security profile can also indicate that the payload data are encrypted with the public asymmetric key provided by the server. In this case, the server performs a decryption using its private asymmetric key.

Preferably, the encryption using a shared symmetric secret key is preferred for equipment having a low computing power.

The decrypted payload data are then processed by the data management central server.

The encrypted transmission of payload data can also be contemplated. In this case, the non-encryption of payload data is indicated in the security profile.

Message Processing after Verifications

The payload data Data1, once they are decoded by the server S1, are processed by the module APP_S1. The specific use of the data recovered by the data management central server is not described in the present description. On the other hand, on the client side, the component APP_C1 enables for example one or more sensors or one or more actuators to be managed.

Advantages

The method of the invention enables in particular a communication to be securely established as a request and acknowledgments between a client C1 and a server S1 without having to manage the states of a communication, that is without having to manage sessions between the communicating entities. Thus, the invention makes it possible to dispense with a complex preliminary protocol, such as VPN, between two communicating entities of a network.

The means of a secured communication according to the invention can in particular be implemented by complying with the principles of a REST type architecture.

The invention also makes it possible to dispense with exchanges of authentication certificates. Another advantage of the invention is also to induce a low operational cost given that the secured communication can be quickly established between two communicating entities as soon as they are installed on the communication network(s).

The solution of the invention also enables a faulty equipment C1 detected by the server S1 to be suspended or revoked.

The invention claimed is:

1. A communication method between at least two communicating entities, a first communicating entity generating at least one payload data message, emitted to a second communicating entity, comprising a payload field including payload data and an authentication header, said method comprising, for generating said message:
   generating a context parameter including at least one datum representative of a hardware configuration of the first entity;
   transmitting a piece of information comprising a symmetric shared secret key;
   generating an asymmetric public key and an asymmetric private key by an asymmetric key generation module of the first entity, said generated asymmetric public and private keys being recorded in a first memory of the first entity;
   transmitting by the first entity to the second entity a record request including an identifier of the first entity, the context parameter and said asymmetric public key;
   transmitting by the second entity to the first entity an acknowledgment indicating a recording of the first entity in a database of the second entity;
   encrypting from the asymmetric private key the symmetric shared secret key;
   generating a security profile integrated into the authentication header and defining the conditions:
      of encrypting the payload data of the message;
      of generating a signature by a signature algorithm applied at least to the payload data;
      the symmetric shared secret key being used to generate the signature and to encrypt the payload data;
   generating said signature integrated into the authentication header, the signature being applied to the context parameter;
   inserting a stored identifier of the first communicating entity into the authentication header;
   inserting the context parameter into the authentication header;
   aggregating the payload field and the header,
   wherein the method further comprises a periodic renewal of the symmetric shared secret key including:
      generating a new symmetric secret key from a symmetric key generation module;
      encrypting, by the asymmetric private key, the symmetric secret key stored in a memory of the first entity, and transmitting the new symmetric shared secret key to the second entity.

2. The communication method according to claim 1, wherein the message emitted to the second communicating entity is transmitted in an applicative layer of a data network to which the first and second communicating entities are connected.

3. The communication method according to claim 1, wherein the context parameter further comprises one or more of data from the following ones:
   an identifier of a calculator of the first communicating entity;
   a datum representative of the used and not used input/output ports of the first communicating entity;
   an update date of a firmware of the first communicating entity;
   a datum representative of the memory space occupied by the firmware.

4. The communication method according to claim 1, wherein the context parameter is encrypted by a first asymmetric public key before being integrated into the emitted message, said first asymmetric public key being recorded in the first memory of the first communicating entity, the context parameter being decrypted thanks to the first asymmetric private key recorded in a memory of the second communicating entity.

5. The communication method according to claim 1, wherein the second communicating entity comprises a database storing a plurality of context parameters, each being associated with one among several first entities, the receiving by the second communicating entity of said message emitted by the first communicating entity including:
   verifying that the context parameter and the identifier of the first communicating entity received by the second communicating entity are present in the database;
   processing said message received when the verification state is validated.

6. The communication method according to claim 5, wherein the receiving by the second communicating entity of said message emitted by the first communicating entity further includes:
   analysing by an application manager the second communicating entity in order to determine whether an update of a firmware or an installation of a new first communicating entity has occurred;

updating the database of the second communicating entity taking into account the context parameter and the identifier of the first communicating entity received when the analysis indicates that an update or a new installation has occurred.

7. The communication method according to claim 1, wherein the payload data comprise data collected by at least one sensor of the first communicating entity.

8. The communication method according to claim 1, further comprising a periodic renewal of the symmetric shared secret key including:
   generating a new symmetric secret key from the symmetric key generation module;
   transmitting the new symmetric shared secret key.

9. The communication method according to claim 1, wherein the payload data comprise the context parameter, the context parameter being repetitively generated and emitted.

10. The communication method according to claim 1, wherein generating said message comprises:
    generating a message identifier calculated from:
       a randomly generated parameter and provided by a random module and;
       an expiry date generated by a clock module;
    inserting the message identifier into the authentication header of said message.

11. The communication method according to claim 10, wherein the security profile defines the conditions for generating a signature by the signature algorithm which is applied to the payload data of the message, to the context parameter and to the message identifier.

12. The communication method according to claim 1, wherein the data signed by the signature algorithm comprise:
    the security profile;
    the identifier of the first communicating entity.

13. A communicating entity comprising at least one memory, a calculator and a communication interface for carrying out the communication method according to claim 1.

14. The communicating entity according to claim 13, further comprising at least one data sensor.

15. A non-transitory computer readable medium comprising a set of instructions for implementing the communication method according to claim 1.

* * * * *